US006752548B2

United States Patent
Azami

(10) Patent No.: US 6,752,548 B2
(45) Date of Patent: Jun. 22, 2004

(54) PRINTER AND PRINT SYSTEM

(75) Inventor: Osamu Azami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/434,362

(22) Filed: May 9, 2003

(65) Prior Publication Data

US 2004/0101336 A1 May 27, 2004

(30) Foreign Application Priority Data

May 9, 2002 (JP) .................................. P2002-133709

(51) Int. Cl.[7] .............................................. B41J 11/44
(52) U.S. Cl. ........................... 400/76; 400/61; 400/62; 400/70
(58) Field of Search .......................... 400/76, 70, 61, 400/62, 578, 582; 358/1.15, 1.16; 399/389–393

(56) References Cited

U.S. PATENT DOCUMENTS 6,632,035 B1 * 10/2003 Kawamoto .................. 400/61
6,663,303 B2 * 12/2003 Horiuchi et al. ............. 400/61

FOREIGN PATENT DOCUMENTS

JP 04331163 A * 11/1992 ............ B41J/2/485
JP 10240483 A * 9/1998 ............ G06F/3/12

* cited by examiner

Primary Examiner—Minh H Chau
(74) Attorney, Agent, or Firm—Sughrue Mion, PLLC

(57) ABSTRACT

In a printer having a function of automatically finding out a paper feeder satisfying the condition that the paper size specified in print data and the paper size set in the printer match and then printing, if they match and it is made impossible to find out any paper feeder in which paper remains although print data processing is not complete (paper error state), the user can change the paper size set in the printer and if the paper size is changed to the correct size (print enable state), the printing is continued.

19 Claims, 12 Drawing Sheets

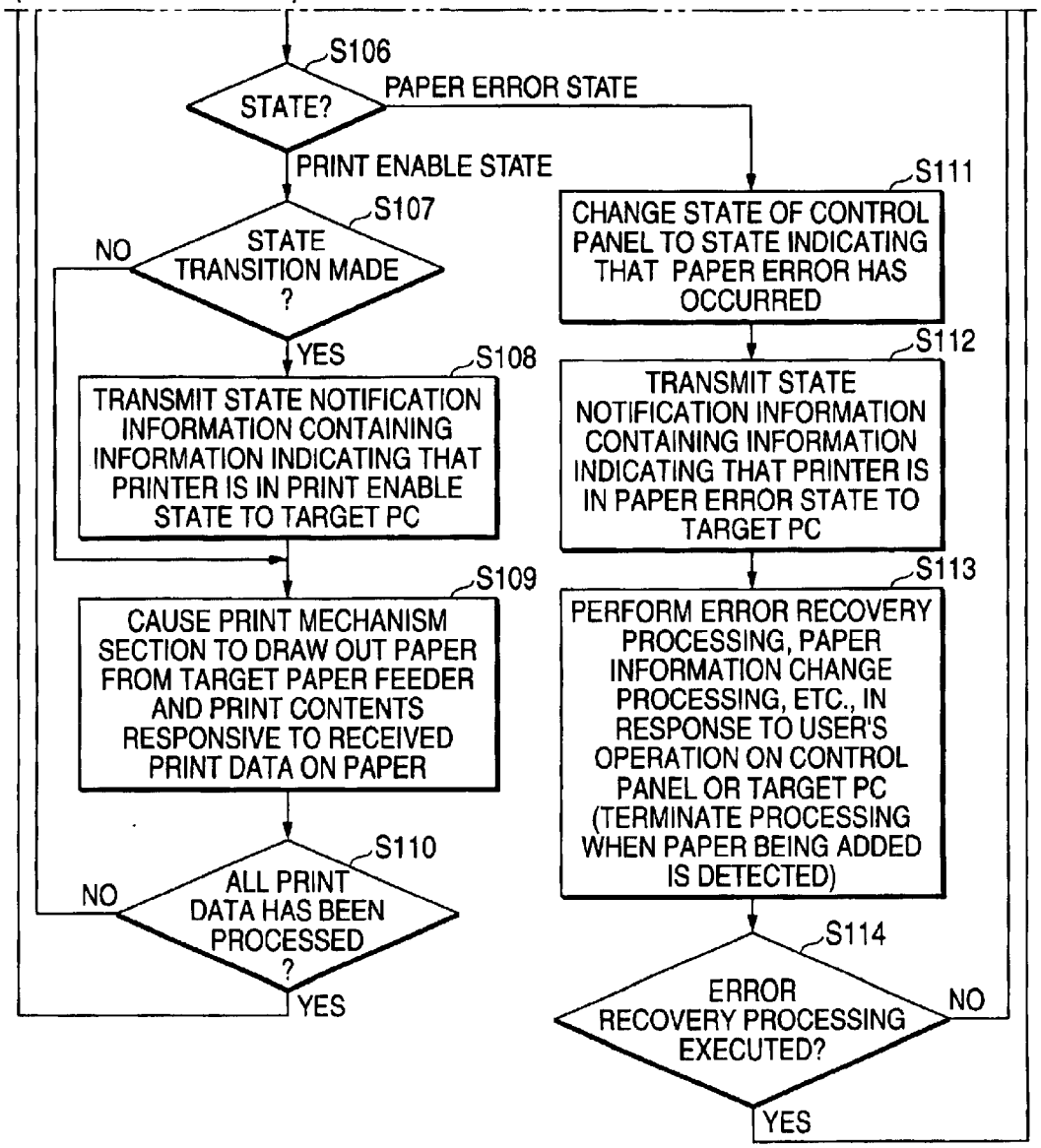

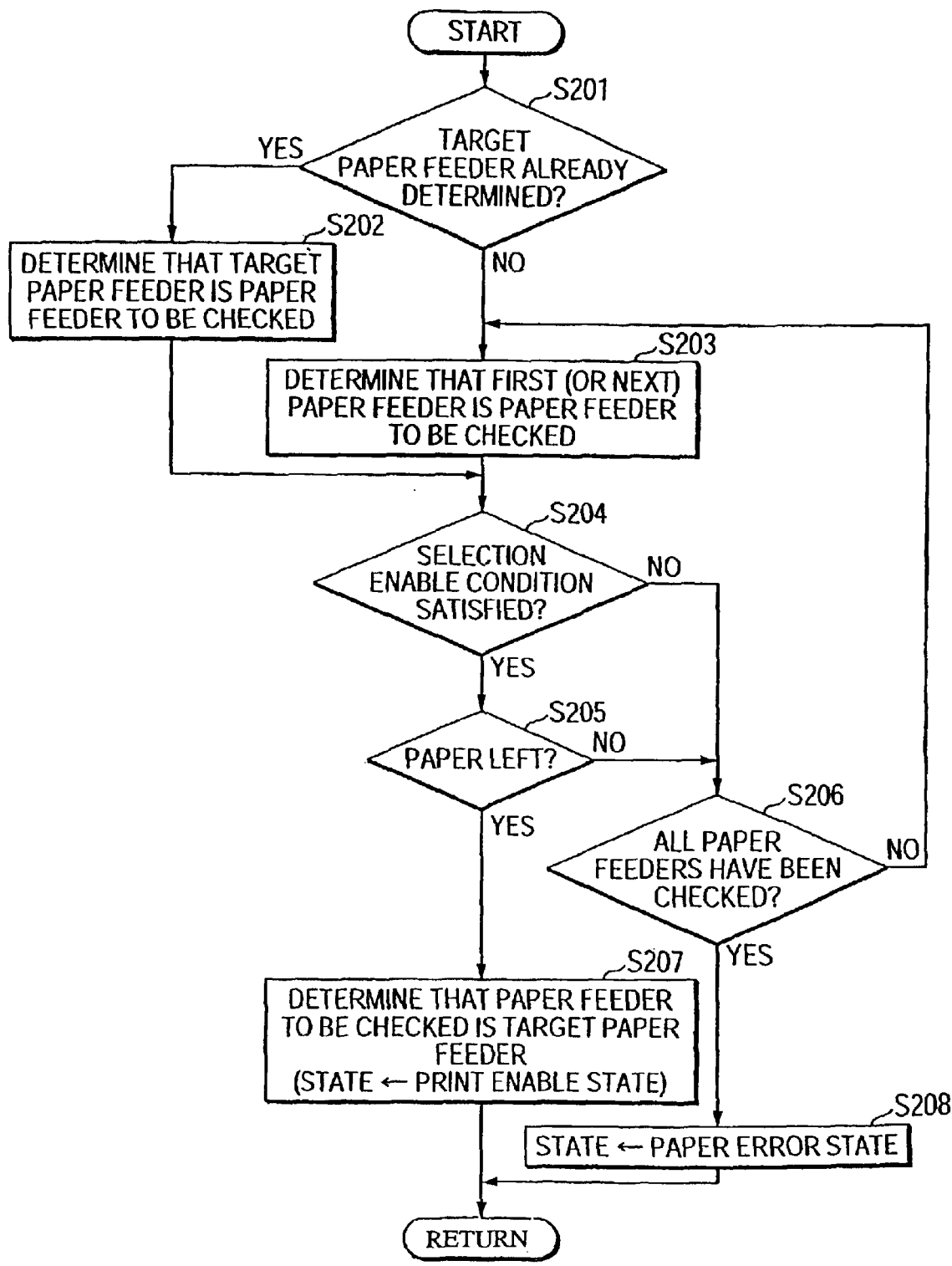

PRINTER AND PRINT SYSTEM

This application is based on Japanese Patent Application No. 2002-133709 filed on May 9, 2002, which is incorporated herein by reference.

BACKGROUND OF THE INVENTION

1. Field of the Invention

This invention relates to a printer and a print system.

2. Description of the Related Art

Most of printers each including a plurality of paper feeders in recent years enable the user to specify the paper feed to be used for printing or specify automatic selection of the paper feeder (without directly specifying the paper feeder) for printing.

Specifically, such a printer is an apparatus, upon reception of print data specifying the paper feeder to be used, for checking that paper of the size specified for use in the print data is set in the paper feeder specified for use and then using paper in the paper feeder for printing, and upon reception of print data specifying automatic selection of the paper feeder, for searching for the paper feeder setting paper of the size and type (or only size) specified for use in the print data among the plurality of paper feeders included in the printer and using paper in the found paper feeder for printing. Further, if the used paper feeder becomes empty of paper after the printer starts printing upon reception of print data specifying automatic selection of the paper feeder, the printer can also switch the paper feeder used for printing to any other paper feeder setting paper of the size and type specified for use in the print data being processed and continue printing.

To make possible the described operation, the printer is configured so that the user can set information indicating the size and type of paper set in each paper feeder, which will be hereinafter referred to as paper size and paper type. Some printers eliminate the need for the user to set the paper size because each paper feeder is provided with a mechanism for detecting the paper size (a mechanism for detecting the paper size from the paper press position, which will be hereinafter referred to as paper size detection mechanism). Some printers require that the user should set the paper size only for each paper feed provided with no paper size detection mechanism because only some paper feeders are provided with a paper size detection mechanism.

If print data processing is interrupted because information set concerning paper in the printer in the related art (paper size, paper type) contains information not representing the size or type of paper actually set in the paper feeder (if a paper-out error, etc., occurs), the printer is an apparatus hard to restart the processing (intricate work being involved).

Specifically, when the paper size set for a paper feeder X (provided with no paper size detection mechanism) is "B5" although paper actually set in the paper feeder X is "A4," upon reception of print data specifying use of the paper feeder X and printing on "A4"-size paper, the printer in the related art interrupts processing for the print data assuming that a size mismatch error has occurred.

When the size mismatch error has occurred, the printer in the related art is an apparatus which requires that the user should perform print stop work and again set the correct paper size for the paper feeder X before again printing Further, upon reception of print data specifying automatic selection of the paper feeder and printing on "A4"-size paper in the state described above, the printer in the related art does not use the paper feeder X and uses any other paper feeder for which setting of "A4"-size paper is set (or the paper size detection mechanism detects "A4"-size paper being set) and which includes paper to start printing. If such a paper feeder runs out during the printing, the printer interrupts processing for the print data assuming that a paper-out error occurs. If such a paper feeder does not exist from the beginning, the printer interrupts processing for the print data assuming that a paper-out error occurs.

If print data processing is interrupted in such a mode, the printer in the related art enables the user to add paper to any other paper feeder than the paper feeder X for continuing the printing, but cannot use paper in the paper feeder X to continue the printing unless the printing is once stopped.

The printer in the related art (for checking paper type match) is an apparatus in which a similar problem can also occur concerning the paper type.

SUMMARY OF THE INVENTION

It is therefore an object of the invention to provide a printer and a print system that can easily restart print data processing interrupted because information concerning paper is not precisely set.

To the end, according to a first aspect of the invention, there is provided a printer for receiving print data containing a specification value specifying specifications of paper to be used for printing and operating, the printer including paper storage means being capable of storing paper of various specifications; print execution means for printing on paper stored in the paper storage means; specification setup value storage means for storing a specification setup value; specification setup value change means for storing a specification setup value specified by the user in the specification setup value storage means; and print control means for monitoring reception of print data, upon reception of print data, determining whether or not the specification value contained in the print data and the specification setup value stored in the specification setup value storage means match, if they match, starting print control processing of causing the print execution means to print in response to the print data, if they do not match, interrupting the print control processing, waiting for the specification setup value change means to change the specification setup value in the specification setup value storage means, and if the specification setup value in the specification setup value storage means is changed to the value matching the specification value contained in the print data, restarting the print control processing.

That is, the printer according to the first aspect of the invention starts to print after checking that the specifications concerning paper to be used, specified in the print data and the specifications concerning paper, stored in the printer (set by the user) match. If they do not match (although the user sets paper of specifications different from those set so far in paper storage means, the user forgets about changing the specifications in the specification setup value storage means to the correct specifications), the user can change the specification setup value in the specification setup value storage means and if the specification setup value in the specification setup value storage means is changed to the correct value, the printing is continued. Therefore, the printer can function as a printer that can easily restart print data processing interrupted because the information concerning paper is not precisely set.

According to a second aspect of the invention, there is provided a printer for receiving print data containing a specification value specifying specifications of paper to be used for printing and operating, the printer including a plurality of paper storage means each being capable of storing paper of various specifications; paper presence/absence detection means for detecting the presence or absence of paper in each of the plurality of paper storage means; print execution means being capable of printing on paper stored in any of the plurality of paper storage means to print on paper specification setup value storage means for storing a specification setup value for each of the plurality of paper storage means; specification setup value change means for changing the specification setup value in the specification setup value storage means concerning the paper storage means specified by the user to user-specified specification value; and print control means for waiting for print data to be received, upon reception of print data, repeating print control processing of finding the paper storage means satisfying a selection enable condition of a condition that the specification value contained in the print data and the specification setup value stored in the specification setup value storage means match and paper remains among the plurality of paper storage means using the paper presence/absence detection means and causing the print execution means to print the contents responsive to the received print data on paper stored in the found paper storage means until printing of all pages requested to be printed on the print data is complete or the printer is placed in a state in which the plurality of paper storage means do not contain any paper storage means satisfying the selection enable condition, if the printer is placed in the state in which the plurality of paper storage means do not contain any paper storage means satisfying the selection enable condition before printing of all pages requested to be printed on the print data is complete, interrupting the print control processing and waiting for the specification setup value change means to change the specification setup value in the specification setup value storage means, and if the specification setup value concerning one paper storage means in the specification setup value storage means is changed to the value matching the specification value contained in the print data, restarting the interrupted print control processing.

That is, the printer according to the second aspect of the invention automatically selects the paper storage means satisfying the condition that the specifications concerning paper to be used, specified in the print data (specification value) and the specifications concerning paper, stored in the printer (specification setup value set by the user) match, and then prints. If they match and it is made impossible to find out paper storage means in which paper remains although the print data processing is not complete, the user can change the specification setup value in the specification setup value storage means and if the specification setup value in the specification setup value storage means is changed to the correct value, the printing is continued. Therefore, like the printer according to the first aspect of the invention, the printer can function as a printer that can easily restart print data processing interrupted because the information concerning paper is not precisely set.

According to a third aspect of the invention, there is provided a printer including a plurality of paper storage means each being capable of storing paper of various specifications; paper presence/absence detection means for detecting the presence or absence of paper in each of the plurality of paper storage means; print execution means being capable of printing on paper stored in any of the plurality of paper storage means to print on paper; specification setup value storage means for storing a specification setup value for each of the plurality of paper storage means; specification setup value change means for changing the specification setup value in the specification setup value storage means concerning the paper storage means specified by a user to user-specified specification value; and print control means for receiving print data which always contains a specification value specifying specifications of paper to be used for printing and may or may not contain paper storage means specification information specifying any of the-plurality of paper storage means and causing the print execution means to print.

In the printer according to the third aspect of the invention, upon reception of the print data not containing the paper storage means specification information, the print control means repeats print control processing of finding the paper storage means satisfying a selection enable condition of a condition that the specification value contained in the print data and the specification setup value stored in the specification setup value storage means match and paper remains among the plurality of paper storage means using the paper presence/absence detection means and causing the print execution means to print the contents responsive to the received, print data on paper stored in the found paper storage means until printing of all pages requested to be printed on the print data is complete or the printer is placed in a state in which the plurality of paper storage means do not contain any paper storage means satisfying the selection enable condition, if the printer is placed in the state in which the plurality of paper storage means do not contain any paper storage means satisfying the selection enable condition before printing of all pages requested to be printed on the print data is complete, interrupts the print control processing and waits for the specification setup value change means to change the specification setup value in the specification setup value storage means, and if the specification setup value concerning one paper storage means in the specification setup value storage means is changed to the value matching the specification value contained in the print data, restarts the interrupted print control processing. Upon reception of the print data containing the paper storage means specification information, the print control means determines whether or not the specification value contained in the print data and the specification setup value concerning the paper storage means specified by the paper storage means specification information contained in the print data in the specification setup value storage means match, if they match, causes the print execution means to print in response to the print data, if they do not match, waits for the specification setup value change means to change the specification setup value concerning the paper storage means specified by the paper storage means specification information in the specification setup value storage means, and if the specification setup value in the specification setup value storage means is changed to the value matching the specification value contained in the print data, causes the print execution means to print in response to the print data.

The printer according to the third aspect of the invention having the configuration functions as an apparatus having both the function of the printer according to the first aspect of the invention and the function of the printer according to the second aspect of the invention. Therefore, like the printer according to the first, second aspect of the invention, the printer can function as a printer that can easily restart print data processing interrupted because the information concerning paper is not precisely set.

To implement the printer according to each aspect of the invention, the specification setup value change means may receive specification of the specification setup value, etc., from the user through a control panel, etc., placed on the printer; the specification setup value change means of the printer according to the first aspect of the invention may be means having a function of storing the user-specified specification setup value contained in received information in the specification setup value storage means; the specification setup value change means of the printer according to the second aspect of the invention may be means having a function of keeping track of user-specified paper storage means and user-specified specification value from received information and changing the specification setup value in the specification setup value storage means concerning the user-specified paper storage means to the user-specified specification setup value. Using such means as the specification setup value setup means, there can be provided a printer enabling the user to change the specification setup value without the need for the user to go to the installation place of the printer.

To implement the printer according to each aspect of the invention, to make it possible to interrupt printing, when the print control processing is interrupted, the print control means may be means for waiting for the specification setup value change means to change the specification setup value in the specification setup value storage means and also waiting for a print cancel command to be given, and if the specification setup value in the specification setup value storage means is changed to the value matching the specification value contained in the print data, the print control means may be means for causing the print execution means to print in response to the print data and if a print cancel command is given, the print control means may be means for canceling processing for the print data and making a transition to a state in which new print data can be received.

To implement the printer according to each aspect of the invention, the specification value and the specification setup value may be information concerning paper; for example, the specification value and the specification setup value may be paper size specification information or may be paper size and type specification information.

According to a fourth aspect of the invention, there is provided a printer including a plurality of paper storage means each being capable of storing paper of various specifications; print execution means being capable of printing on paper stored in any of the plurality of paper storage means to print on paper; and print control means for waiting for reception of print data containing paper supply source specification information that can specify one or more paper storage means of the plurality of paper storage means, upon reception of print data, starting print control processing of causing the print execution means to print the contents responsive to the print data on paper stored in the paper storage means specified in the paper supply source specification information contained in the print data, when the paper storage means specified in the paper supply source specification information becomes empty of paper, interrupting the print control processing and waiting for new paper supply source specification information to be given, and if new paper supply source specification information is given, restarting the print control processing in a mode in which the printing is continued using paper stored in the paper storage means specified in the new paper supply source specification information.

That is, after printing is started in accordance with the paper supply source specification information contained in the received print data (information directly specifying the paper storage means to be used for printing or information indirectly specifying the paper storage means to be used for printing according to the specifications of paper), when paper runs out, the printer according to the fourth aspect of the invention waits for a paper supply source specification information change command (new paper supply source specification information) to be given. When new paper supply source specification information is given, the printer continues the printing in accordance with the new paper supply source specification information. Therefore, the printer functions as a printer that can easily restart print data processing interrupted because the information concerning paper is not precisely set or for any other reason.

A print system of the invention includes a printer according to each aspect of the invention and a host for transmitting print data to the printer and therefore functions as a system that can easily restart print data processing interrupted because the information concerning paper is not precisely set or for any other reason.

Other features and advantages of the invention will become more apparent from the following detailed description of the preferred embodiments of the invention in conjunction with the accompanying drawings.

BRIEF DESCRIPTION OF THE DRAWINGS

In the accompanying drawings:

FIG. 7 is a flowchart of target paper feeder determination processing executed by the control section in the printer according to the embodiment of the invention.

DETAILED DESCRIPTION OF THE PREFERRED EMBODIMENTS

Referring now to the accompanying drawings, there are shown preferred embodiments of the invention To begin with, an outline of a print system according to one embodiment of the invention will be discussed with FIGS. 1 to 3.

Figure 1:
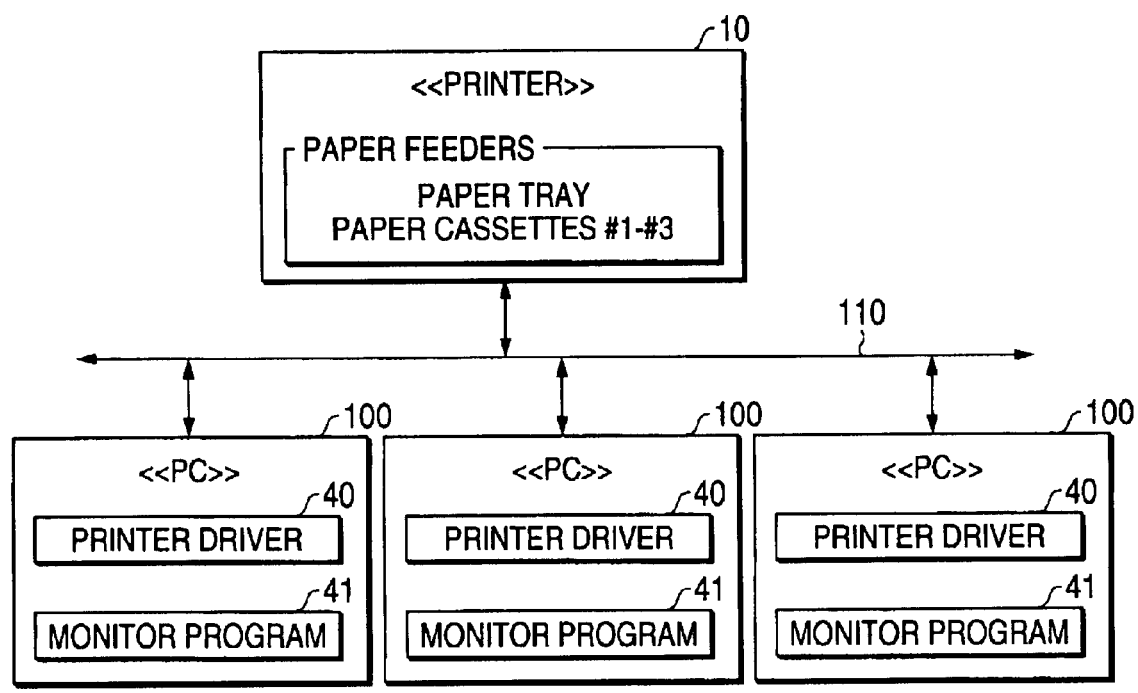
FIG. 1 is a block diagram to show the configuration of a print system according to one embodiment of the invention.
Figure 2:
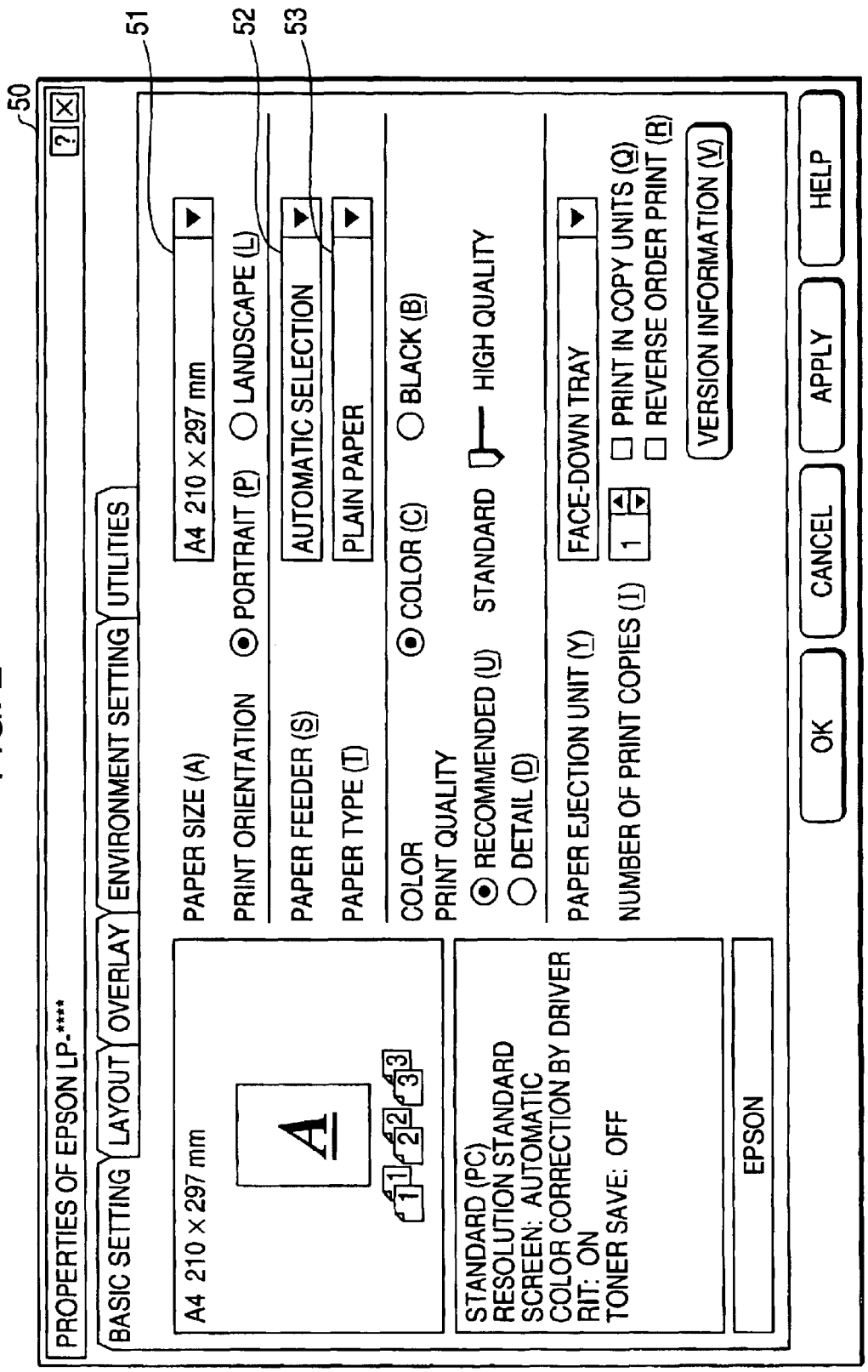
FIG. 2 is a schematic representation of a property dialog box of a printer displayed by a printer driver installed in a personal computer forming a part of the print system according to the embodiment of the invention.

As shown in FIG. 1, the print system according to the embodiment is a system including one or more personal computers (PCs) 100 (corresponding to hosts) each wherein a printer driver 40 and a monitor program 41 are installed and a printer 10, the PCs 100 and the printer 10 being connected by a LAN cable 110.

The printer 10 forming a part of the print system includes a plurality of paper feeders (in the embodiment, a paper tray and paper cassettes #1 to #3) and enables the user to specify a paper feeder storing paper used for printing for printing and also enables the user to specify automatic selection of a paper feeder (without specifying a paper feeder used for printing) for printing. The printer 10 uses each paper feeder provided with a sensor that can detect the approximate remaining amount of paper, which will be hereinafter referred to as paper remaining amount sensor, but not provided with a sensor for detecting the paper size. That is, the printer 10 requires that the user should set paper sizes (and paper types) concerning all paper feeders.

The printer driver 40 installed in the PC 100 forming a part of the print system is a program for giving the PC 100 a function of generating print date for the printer 10 and transmitting the print date to the printer 10. The printer driver 40 displays a property dialog box 50 as show in FIG. 2, namely, the property dialog box 50 having controls 51 and 53 for the user to set the paper size and paper type respectively and a control 52 (drop-down list combo box) for enabling the user to select AUTOMATIC SELECTION as a control for setting conditions concerning each paper feeder.

Figure 3:
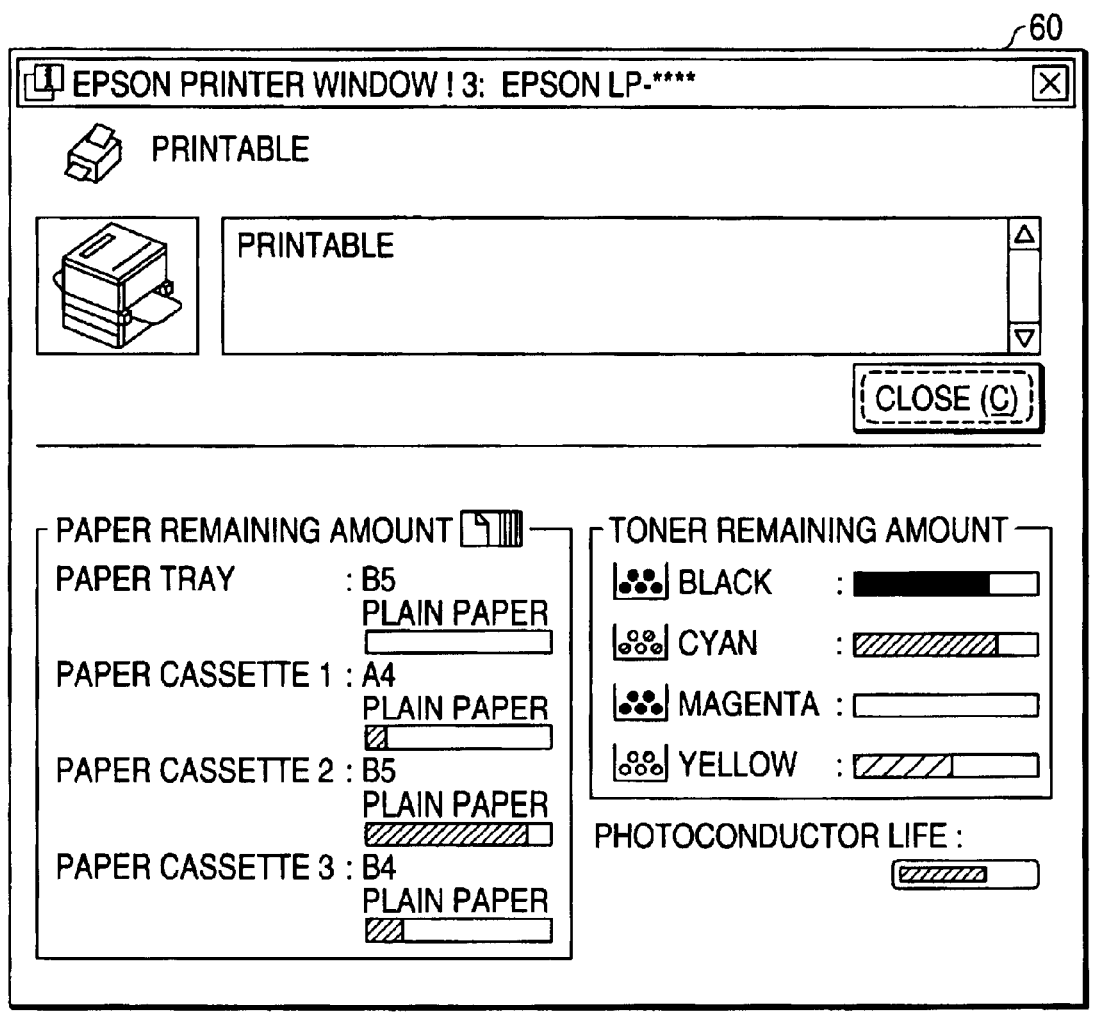
FIG. 3 is a schematic representation of a printer detail window displayed by a monitor program installed in the personal computer according to the embodiment of the invention.

The monitor program 41 is a program for giving the PC 100 a function of displaying a printer detail window 60 (a window for enabling the user to check the state of the printer 10) as shown in FIG. 3. Although described later in detail, the monitor program 41 is a program which is started by the printer driver 40 at the print start time (when transmission of print data is started) and can also be started intentionally by the user.

Although the user sets paper of size/type different from that set so far in one paper feeder of the printer 10, the user forgets about again setting the paper size/paper type concerning the paper feeder. As a result, when a paper error occurs and printing is interrupted, the print system enables the user to continue printing without performing intricate work (print stop work, paper adding work, etc.,).

The configuration and operation of the print system will be discussed more specifically on the understanding as described above.

To, begin with, the hardware configuration of the printer will be discussed with FIG. 4.

As shown in the figure, the printer 10 is made up of a control section 11, a control panel 12, and a print mechanism section 13.

Figure 5:
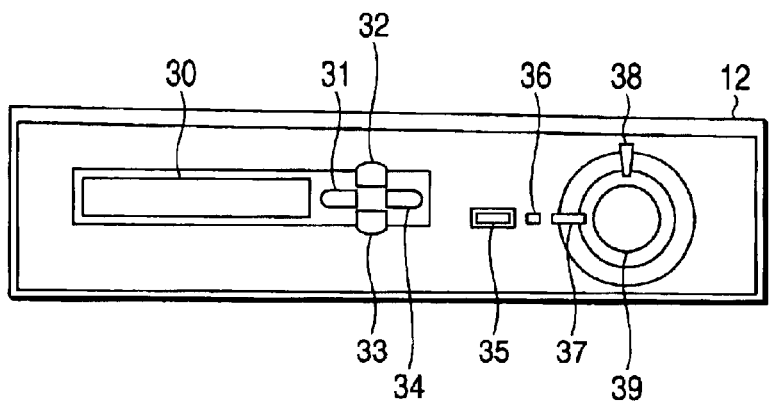
FIG. 5 is an external view of a control panel placed on the printer according to the embodiment of the invention

The control panel 12 is a unit placed on the top of the printer 10 for functioning as an interface between the user and the printer 10. The control panel 12 includes a liquid crystal display (LCD) 30, a back switch 31, an up switch 32, a down switch 33, a setting execution switch 34, a job cancel switch 35, a data lamp 36, a print enable lamp 37, an error lamp 38, and a print enable switch 39, as shown in FIG. 5.

The print mechanism section 13 (FIG. 4) is a mechanism for printing on paper stored in any paper feeder under the control of the control section 11. The print mechanism section 13 is made up of a print engine for actually printing on paper based on a signal supplied from the control section 11 (in the embodiment, executing electrophotographic color print), a plurality of paper feeders for supplying paper to the print engine (in the printer 10, the paper tray and the paper cassettes #1 to #3), a paper ejection unit for ejecting paper on which printing has been performed to the outside of the printer 10, and the like. Each paper feeder is provided with the paper remaining amount sensor, but not with a sensor for detecting the setup paper size, as previously described The control section 11 is a unit for performing processing of causing the print mechanism section 13 to generate printed matter having contents responsive to received print data.

Figure 4:
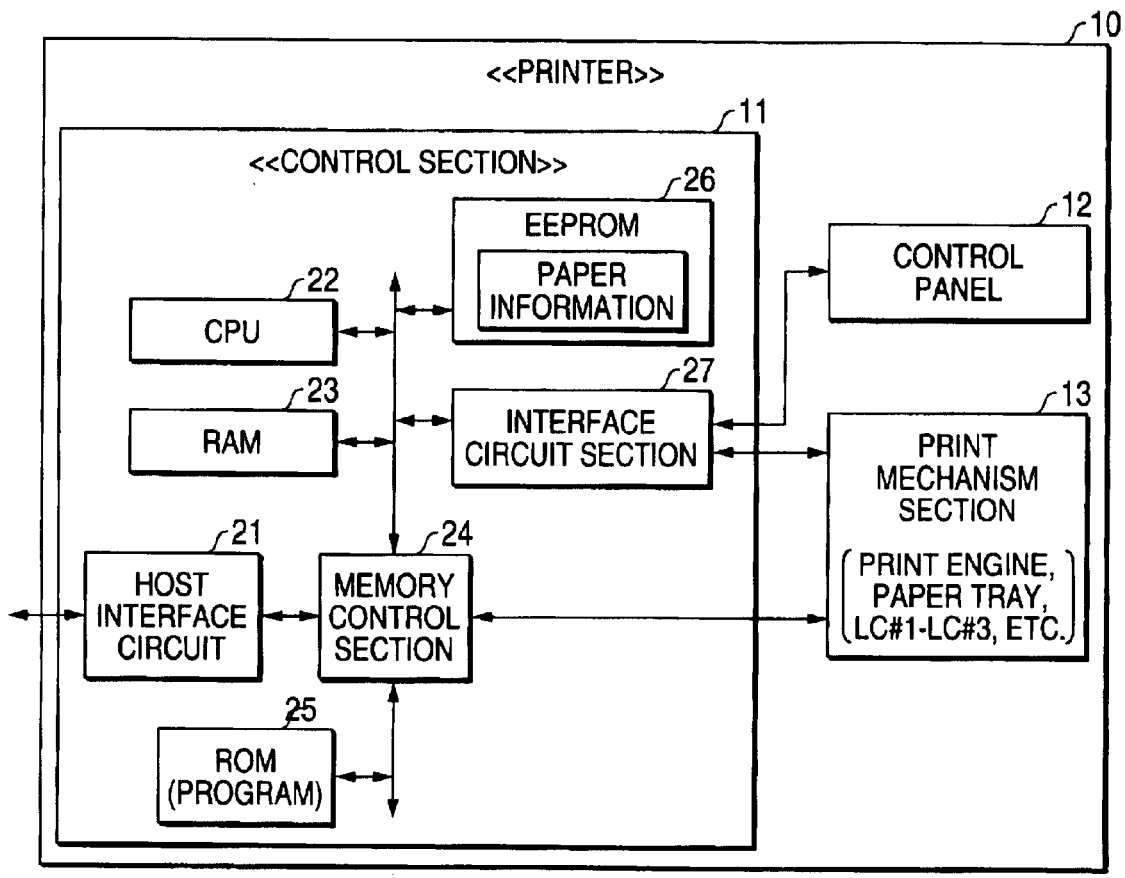
FIG.4 is a block diagram to show the hardware configuration of the printer forming a part of the print system according to the embodiment of the invention.

As shown in FIG. 4, the control section 11 is made up of a host interface circuit 21, a CPU 22, RAM 23, a memory control section 24, ROM 25, EEPROM 26, an interface circuit section 27, etc.

The ROM 25 is nonvolatile memory storing various programs. The RAM 23 is memory into which the program stored in the ROM 25 is read and is also memory used as a working area of the program read into the RAM 23.

The EEPROM 26 is nonvolatile memory for storing various pieces of information defining operation conditions just after the power of the printer 10 is turned on. An area for storing paper information set by user by paper feeder is reserved in the EEPROM 26 The paper information is information made up of paper size of data indicating the size of paper (A4, B5, etc., ) and paper type of data indicating the type of paper (PLAIN PAPER, RECYCLED PAPER, etc.,).

The CPU 22 is a control circuit for totally controlling the sections in accordance with the program in the RAM 23 The host interface circuit 21 is a circuit for communicating with the PC 100 (printer driver 40, monitor program 41) under the control of the CPU 22. The memory control section 24 is a circuit for performing processing of transferring data from the host interface circuit 21 to the RAM 23, processing of supplying a signal responsive to print image data generated by the CPU 22 to the print engine 13, etc., under the control of the CPU 22. The interface circuit section 27 is a unit made up of several interface circuits for transferring data between the CPU 22 and the control panel 12 and between the CPU 22 and the print engine 13.

Next, the operation of the control section 11 in the printer 10 (control procedure of the sections by the CPU 22) is as follows:

If the user presses the setting execution switch 34 on the control panel 12, the control section 11 acquires a change command about paper information (paper size/paper type) concerning each paper feeder from the user while changing the display contents of the LCD 30 in response to the user's operation performed on the switches 31 to 34, and rewrites new paper information responsive to the acquired change command into the EEPROM 26. Upon reception of information in a predetermined format indicating paper of what size/type is set in each paper feeder from the PC 100, the control section 11 rewrites new paper information responsive to the received information into the EEPROM 26.

Figure 6:
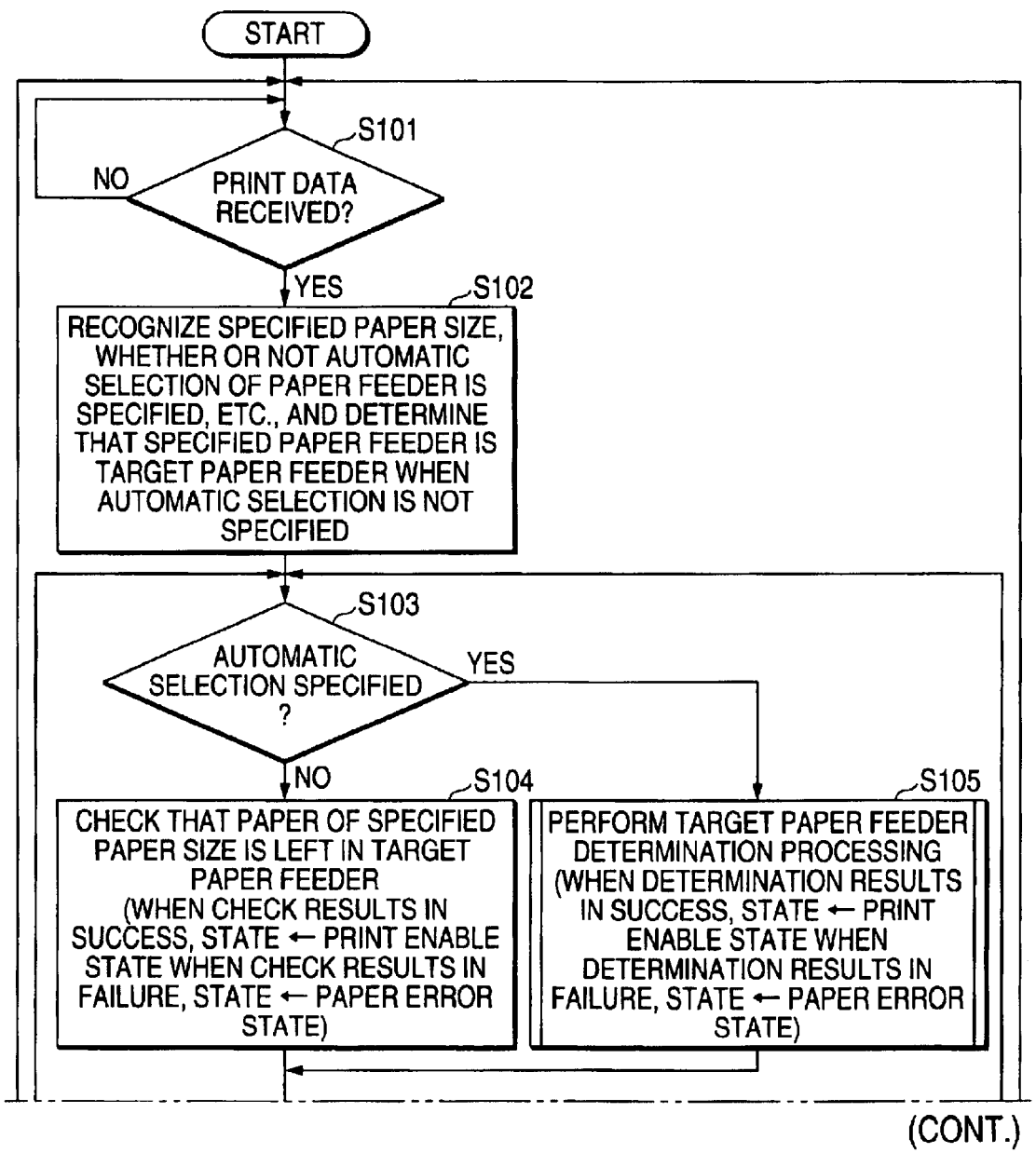
FIG. 6 is a flowchart to show a received print data processing procedure of a control section in the printer according to the embodiment of the invention.

When print data is transmitted from the PC 100, the control section 11 processes the print data according to a procedure shown in FIG. 6

That is, in the normal state, the control section 11 waits for print data to be transmitted from any PC 100 (step S101). When detecting print data being received (YES at step S101), the control section 11 performs the following processing at step S102:

The control section 11 first recognizes the paper size specified by the user (specified paper size) based on information (job control command group) contained in the top of the received print data, and determines whether or not the print data specifies automatic selection of the paper feeder. If the received print data does not specify automatic selection of the paper feeder (if the user specifies the paper feeder used for printing), the control section 11 recognizes the user-specified paper feeder and the user-specified paper type (specified paper type), and determines that the recognized paper feeder is the target paper feeder used for printing.

After performing the processing at step S102, if the received print data does not specify automatic selection of the paper feeder (NO at step S103), at step S104, the control section 11 checks that the conditions that the specified paper size matches the paper size concerning the target paper feeder (user-specified paper feeder) stored in the EEPROM 26 and that paper is left in the target paper feeder (the paper remaining amount sensor of the target paper feeder detects paper being left therein) are satisfied. If the control section 11 cannot check that the conditions are satisfied, it stores occurrence of a paper error and terminates the processing at step S104. If the control section 11 can check that the conditions are satisfied, it stores a print enable state and terminates the processing at step S104.

On the other hand, if the received print data specifies automatic selection of the paper feeder (YES at step S103), the control section 11 performs target paper feeder determination processing at step S105.

As shown in FIG. 7, when performing the target paper feeder determination processing, the control section 11 first determines whether or not the target paper feeder is determined (step S201). As for the print data specifying automatic selection of the paper feeder, the target paper feeder is not determined at step S102 (FIG. 6). Thus, if the target paper feeder determination processing is executed first after the print data specifying automatic selection of the paper feeder is received, it is determined at step S201 that the target paper feeder is not determined.

If the target paper feeder is not determined (NO at step S201), the control section 11 determines that the first paper feeder (in the embodiment, the paper tray) is the paper feeder to be checked at step S203 and then at step S204, determines whether or not the selection enable condition that the paper size and the paper type concerning the paper feeder to be checked, stored in the EEPROM 26 match the specified paper size and the specified paper type respectively is satisfied. On the other hand, if the target paper feeder is already determined (YES at step S201), the control section 11 determines that the target paper feeder is the paper feeder to be checked (step S202) and then makes the determination at step S204.

If the selection enable condition is not satisfied (NO at step S204), the control section 11 determines whether all paper feeders have been checked (step S206). If not all paper feeders have been checked (NO at step S206), the control section 11 returns to step S203 and determines that the next paper feeder is the paper feeder to be checked. If the paper feeders to be checked when the processing is started are PAPER TRAY, PAPER CASSETTE #1, PAPER CASSETTE #2, AND PAPER CASSETTE #3, the control section 11 determines at step S203 that PAPER CASSETTE #1, PAPER CASSETTE #2, PAPER CASSETTE #3, PAPER TRAY is the paper feeder to be checked.

If the selection enable condition being satisfied for one paper feeder to be checked is detected (YES at step S204), the control section 11 determines whether or not paper is left in the paper feeder to be checked (step S205). If paper is not left (NO at step S205), the control section 11 makes the determination at step S206.

If the control section 11 finds out the paper feeder to be checked satisfying the selection enable condition and having paper left (YES at step S205), the control section 11 determines that the paper feeder to be checked is the target paper feeder and stores a print enable state (step S207). Then, the control section 11 terminates the target paper feeder determination processing.

Upon completion of checking all paper feeders (YES at step S206) without finding out any paper feeder to be checked satisfying the selection enable condition and having paper left, the control section 11 stores a paper error state (step S208) and then terminates the target paper feeder determination processing.

Referring again to FIG. 6, the operation description of the control section 11 is continued.

After completion of step S104 or S105, if the state is the print enable state (print enable state at step S106), the control section 11 determines whether or not the error occurrence state makes a transition to the print enable state at step S104 or S105 executed at this time (step S107). If the error occurrence state does not make a transition to the print enable state at this time (NO at step S107), at step S109, the control section 11 performs processing to cause the print-mechanism section 13 to draw out one sheet of paper from the target paper feeder and print on the sheet of paper. Then, the control section 11 determines whether or not processing for all print data (printing of all pages commanded for printing on print data) is complete (step S110). If not complete (NO at step S110), the control section 11 again executes the processing starting at step S103.

If the error occurrence state makes a transition to the print enable state at this time (YES at step S107), the control section 11 transmits state notification information containing information indicating that no paper error occurs to the PC 100 transmitting the print data (target PC 100) (step S108) and then performs processing at step S109 and later. The operation of the target PC 100 receiving the state notification information will be discussed later. The state notification information is information in a predetermined format containing various pieces of information required for displaying the printer detail window 60 (see FIG. 3). When the printer is placed in a paper error state, the control section 11 also transmits the state notification information to the target PC 100 (as described later in detail).

If the state is the paper error state (paper error state at step S106), the control section 11 changes the state of the control panel 12 to a state indicting that a paper error has occurred (step S111).

Specifically, at step S111, the control section 11 displays "NO PAPER xxxxx yyyy" or "REPLACE PAPER xxxxx yyyy" ("xxxxx" denotes the name of the paper feeder and "yyyy" denotes the paper size) on the LCD 30 of the control panel 12, lights the print enable lamp 37, and blinks the error lamp 38. If a mismatch is found between the paper size in the paper information concerning the specified paper feeder and the specified paper size although paper is left in the specified paper feeder at step S104 after processing is started upon reception of print data specifying the paper feeder, the control section 11 displays "NO PAPER xxxxx yyyy" on the LCD 30. If automatic selection of the paper feeder is specified, the control section 11 displays as "xxxxx" the name of one paper feeder with the paper size and the paper type in the paper information matching the specified paper size and the specified paper type respectively.

After performing the control for the control panel 12, the control section 11 transmits state notification information containing information indicating that a paper error has occurred to the target PC 100 (step S112)

Upon completion of transmitting the state notification information, the control section 11 waits for the user to press the job cancel switch 35 or the setting execution switch 34, a resetting command to be received from the target PC 100, or paper to be added to the paper feeder at step S113.

The operation of the target PC 100 concerning transmission of the resetting command will be discussed later. The resetting command is a command in a predetermined format containing data specifying the paper feeder and data specifying new values of the paper size and the paper type concerning the paper feeder specified in that data. Upon reception of the resetting command, the control section 11 changes the paper information in the EEPROM 26 in response to the contents of the received resetting command. The control section 11 restores the state of the control panel 12 to the normal state (indicating that the printer is in the print enable state) and then terminates step S113.

If the user presses the setting execution switch 34, the control section 11 starts paper information change processing of acquiring a change command about paper information (paper size/paper type) concerning each paper feeder from the user while changing the display contents of the LCD 30 in response to the user's operation performed on the switches 31 to 34, and rewriting new paper information responsive to the acquired change command into the EEPROM 26.

In the paper information change processing, the user can change paper information according to a procedure as shown in FIGS. 8A to 8H.

Figure 8:
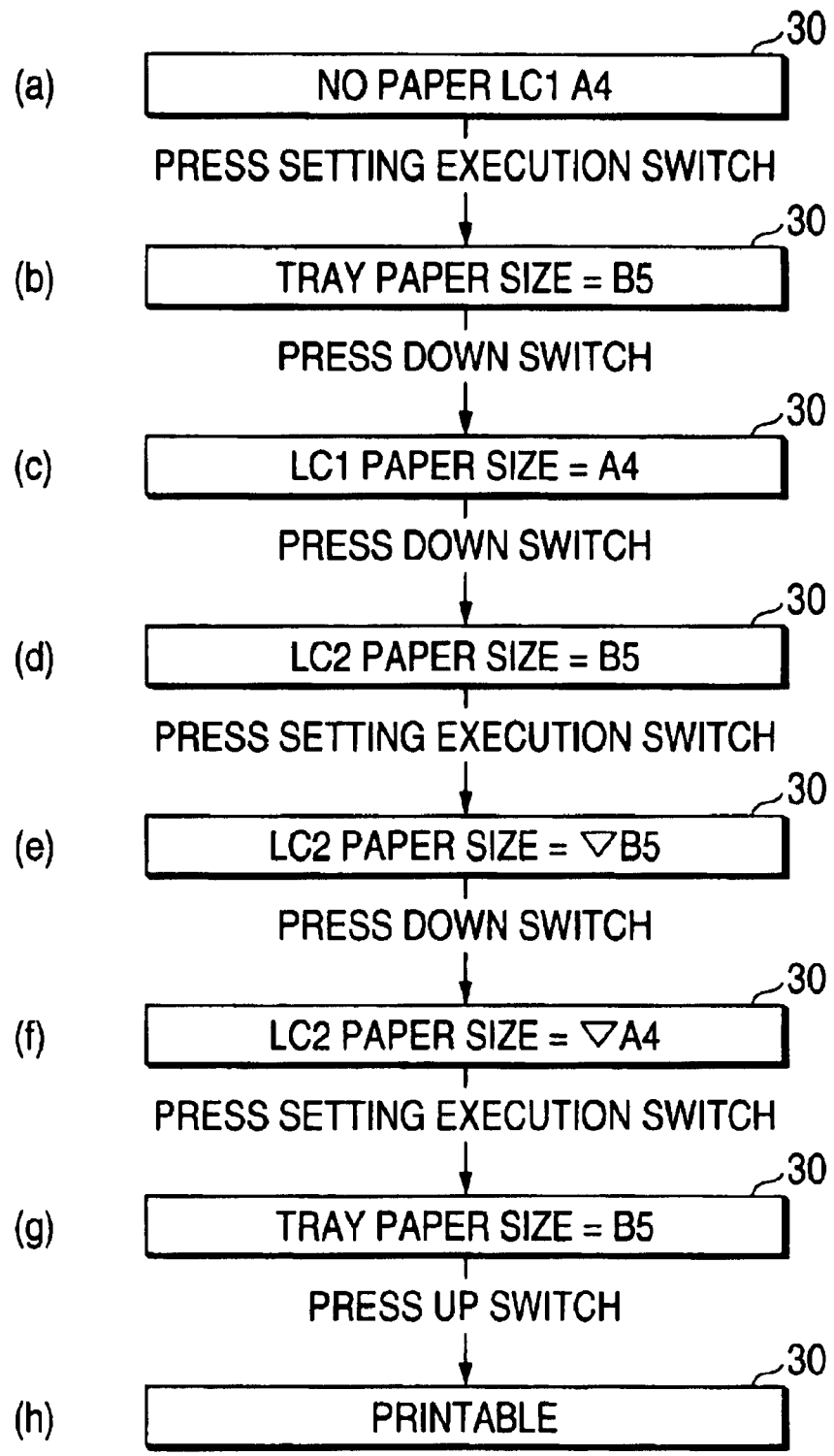
FIGS. 8A to 8H are drawings to describe paper information change processing executed by the control section in the printer according to the embodiment of the invention.

That is, when a paper error occurs, a message indicating occurrence of the paper error, for example, message "NO PAPER LC1 A4" shown in FIG. 8A is displayed on the LCD 30.

To operate the control panel 12 to change paper information, the user presses the setting execution switch 34 in a state in which such a message is displayed on the LCD 30. As the user presses the setting execution switch 34, the control section 11 starts the paper information change processing and first displays a paper size presentation message "TRAY PAPER SIZE=B5" as shown in FIG. 8B on the LCD 30 "TRAY" in the paper size presentation message means the paper tray. "LC1" and "LC2" also contained in other messages mean paper cassettes #1 and #2 respectively.

If the user presses the down switch 33 while the paper size presentation message is displayed, the control section 11 changes the paper size presentation message displayed on the LCD 30 to a message concerning the next paper feeder (see FIGS. 8C, 8D). If the user presses the setting execution switch 34 while the paper size presentation message is displayed, the control section 11 changes the paper size presentation message displayed on the LCD 30 to a set paper size presentation message indicating that the printer is in a state in which paper size change is accepted (see FIG. 8E; message having "▽" added between "=" and "B5," etc., of paper size presentation message).

If the user presses the down switch 33 while the set paper size presentation message is displayed, the control section 11 changes the set paper size presentation message displayed on the LCD 30 to a message concerning any other paper (see FIGS. 8E, 8F). If the user presses the setting execution switch 34 while the set paper size presentation message is displayed, the control section 11 replaces the paper size in the EEPROM 26 concerning the paper feeder whose name is contained in the set paper size presentation message at the point in time with the paper size indicated in the set paper size presentation message. After this, the control section 11 again displays the paper size presentation message concerning the paper tray (see FIG. 8G) on the LCD 30.

If the user presses the up switch 32 while the paper size presentation message is displayed, the control section 11 displays "PRINTABLE" on the LCD 30 as shown in FIG. 8H and terminates the paper information change processing and step S113.

If the user presses the back switch 31 while the paper size presentation message is displayed, the control section 11 displays paper type presentation message "TRAY PAPER TYPE=PLAIN" on the LCD 30. The control section 11 enters a state in which it performs similar operation to that at the display time of paper size presentation message/set paper size presentation message in response to pressing each switch on the control panel 12 (the user can change the paper type rather than the paper size).

The control section 11 operates in such a manner. Thus, to again set the paper size concerning LC2 (paper cassette #2), for example, the user repeats pressing the down switch 33 until a paper size presentation message concerning LC2 is displayed after the user presses the setting execution switch 34 when the paper size presentation message concerning LC2 "LC2 PAPER SIZE=B5" is displayed on the LCD 30 (see FIG. 8E), the user presses the setting execution switch 34. Further, the user repeats pressing the down switch 33 until "LC2 PAPER SIZE=▽A4" is displayed on the LCD 30 (see FIG. 8F) (in this case, as the user once presses the down switch 33, "LC2 PAPER SIZE=▽A4" is displayed). The user presses the setting execution switch 34 and to change any other information, presses the down switch 33 (or the setting execution switch 34), the up switch 32. Not to change any other information, the user presses the up switch 32.

Referring again to FIG. 6, the operation description of the control section 11 is continued.

If the control section 11 detects the user pressing the job cancel switch 35 at step S113, the control section 11 executes error recovery processing of discarding the already received print data and restoring the state of the control panel 12 to the normal state (restoring the state of the printer 10 to a state in which new print data can be received). Then, the control section 11 terminates step S113.

If the control section 11 detects paper being added to the paper feeder, the control section 11 terminates step S113 without performing any special processing.

When the control section 11 completing step S113 performed the error recovery processing at step S113 (YES at step S114), the control section 1 returns to step S101 and waits for print data to be received.

On the other hand, when the control section 11 did not perform the error recovery processing at step S113 (NO at step S114), the control section 11 again executes the processing starting at step S103.

That is, when the paper information (paper size, paper type) is changed or paper is added at step S113, a check is again made to see if paper of specifications required for printing exists in the printer 10 and if paper exists, the printing is continued.

Figure 9:
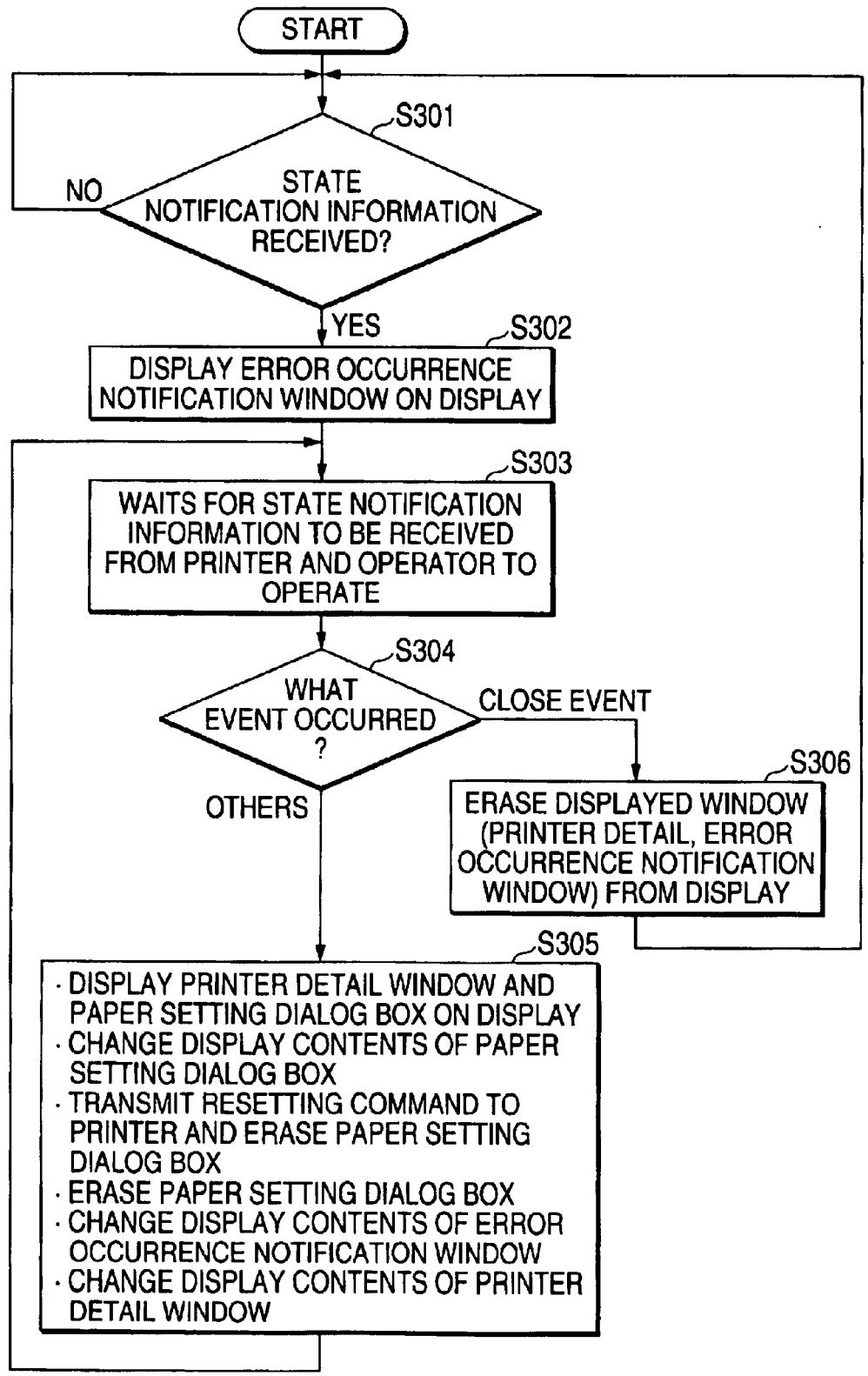
FIG. 9 is a flow chart of processing executed by the monitor program according to the embodiment of the invention.

Next, the operation of the target PC 100 is as follows:

FIG. 9 is a flowchart to show an operation procedure of a CPU in the target PC 100 in accordance with the monitor program 41. The flowchart of FIG. 9 relates to the case where the monitor program 41 is started by the printer driver 40.

Figure 10:
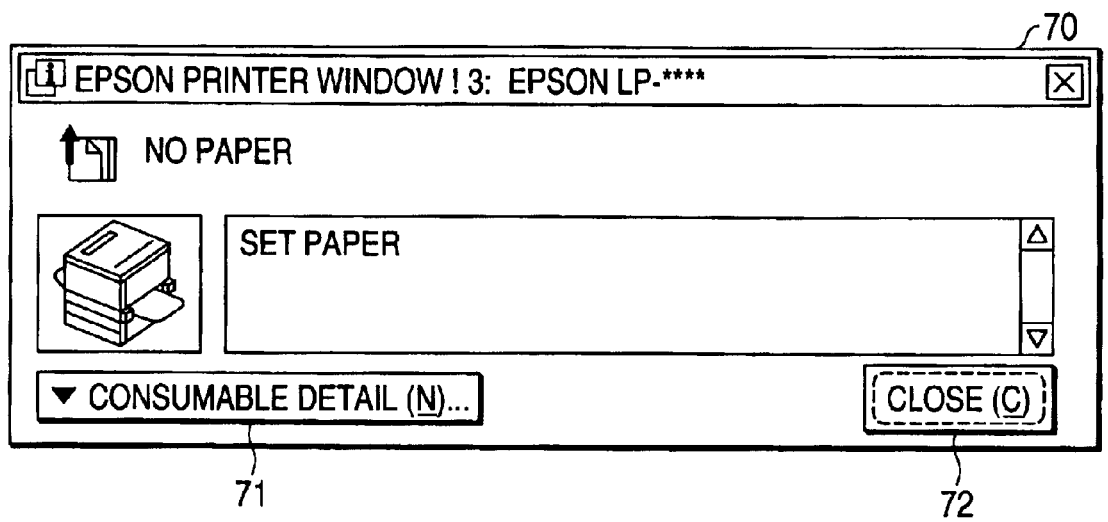
FIG. 10 is a schematic representation of an error occurrence notification window displayed by the monitor program according to the embodiment of the invention.

As shown in the figure, the CPU in the target PC 100 waits for state notification information (containing information indicating error occurrence) to be transmitted from the printer 10 (step S301). When state notification information containing information indicating error occurrence is received (YES at step S301), the CPU displays an error occurrence notification window 70 as shown in FIG. 10 on display of the target PC 100 (step S302).

Displaying the error occurrence notification window 70, the CPU waits for the user to operate the error occurrence notification window 70 and also waits for state notification information to be transmitted from the printer 10 at step S303.

Figure 11:
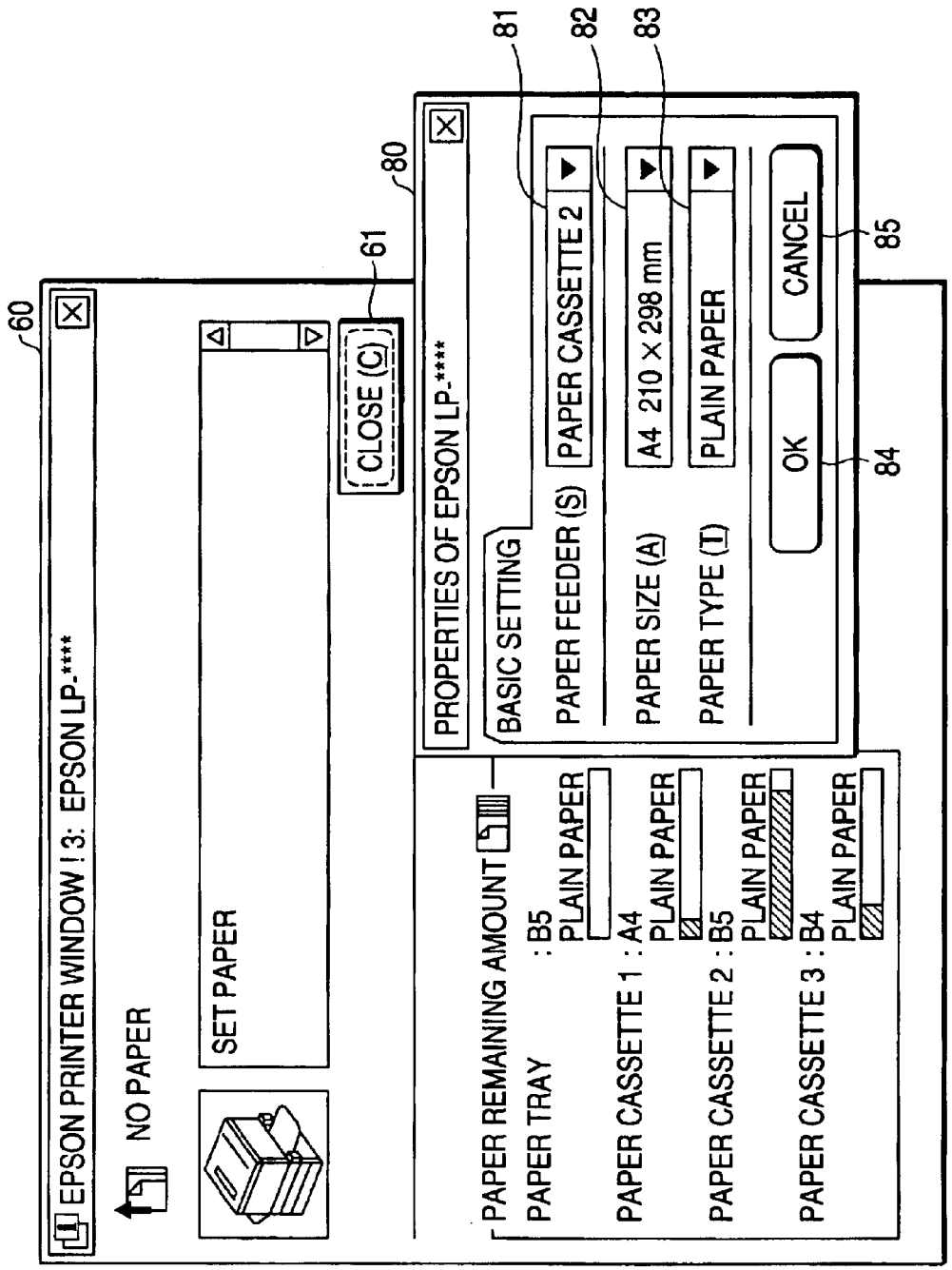
FIG. 11 is a schematic representation of a printer detail window and a paper setting dialog box displayed by the monitor program according to the embodiment of the invention.

When detecting the user pressing a CONSUMABLE DETAIL button 71 on the error occurrence notification window 70 (step S303, step S304; OTHERS), the CPU displays a printer detail window 60 and a paper setting dialog box 80 in a manner as shown in FIG. 11 on the display at step S305. At this time, the displayed printer detail window 60 has the contents responsive to various pieces of information contained in the state notification information received from the printer 10.

Then, the CPU returns to step S303 and waits for the user to operate the paper setting dialog box 80 and also waits for new state notification information to be received from the printer 10.

When the user operates any of controls (drop-down list combo boxes) 81 to 83 on the paper setting dialog box 80 (step S303, step S304; OTHERS), the CPU changes the display contents of the paper setting dialog box 80 in response to the user's operation at step S305. That is, the CPU displays a selectable text (paper size, paper feeder, paper type) list under the control 81, 82, or 83 and displays text selected out of the list in the control 81, 82, or 83. The control 81 on the paper setting dialog box 80 is a control for enabling the user only to specify the paper feeder (not to select AUTOMATIC SELECTION), and the controls 82 and 83 are the same as the controls 51 and 53 on the property dialog box 50 shown in FIG. 2.

When the user presses an OK button 84 on the paper setting dialog box 80 (step S303, step S304; OTHERS), the CPU transmits to the printer 10 a resetting command containing data representing the state of the controls 81 to 83 at the point in time (type of text internally indicated) at step S305. The CPU erases the paper setting dialog box 80 from the display (displays only the printer detail window 60 on the display) and then terminates step S305.

When the user presses a CANCEL button 85 on the paper setting dialog box 80 (step S303, step S304; OTHERS), the CPU erases the paper setting dialog box 80 from the display without transmitting the resetting command to the printer 10 at step S305.

Upon reception of state notification information containing information indicating that the printer 10 is in an error state when only the printer detail window 60 are displayed on the display (step S303, step S304; OTHERS), the CPU changes the display contents of the printer dialog box 80 from the display and changes the display contents of the printer detail window 60 to those responsive to the received state notification information and displays the paper setting dialog box 80 on the printer detail window 60 at step S305. Then, the CPU returns to step S303 and waits for the user to operate the printer detail window 60 and for state notification information to be transmitted from the printer 10.

Upon reception of state notification information containing information indicating that the printer 10 is in a print enable state when only the printer detail window 60 is displayed (step S303, step S304; OTHERS), the CPU changes the display contents of the printer detail window 60 to those responsive to the received state notification information at step S305. Then, the CPU returns to step S303 and waits for the user to operate the printer detail window 60 and for state notification information to be transmitted from the printer 10. On the other hand, upon reception of state notification information containing information indicating that the printer 10 is in an error state when only the printer detail window 60 is displayed (step S303, step S304; OTHERS), the CPU changes the display contents of the printer detail window 60 to those responsive to the received state notification information and displays the paper setting dialog box 80 on the printer detail window 60 at step S305. Then, the CPU returns to step S303 and waits for the user to operate the paper setting dialog box 80 and for state notification information to be transmitted from the printer 10.

Upon reception of state notification information containing information indicating that the printer 10 is in a print enable state when the error occurrence notification window 70 is displayed or if the user pressing a CLOSE button 72 on the error occurrence notification window 70 is detected (step S303, step S304; CLOSE EVENT), the CPU erases the displayed error occurrence notification window 70 from the display at step S306 The CPU returns to step S301 and again waits for state notification information to be received. If the user pressing the CLOSE button 72 is detected when only the printer detail window 60 is displayed (step S303, step S304; CLOSE EVENT), the CPU erases the displayed printer detail window 60 from the display at step S306. The CPU returns to step S301 and again waits for state notification information to be received.

The operation of the print system will be discussed more specifically by taking as an example the case where print data specifying AUTOMATIC SELECTION of the paper feeder and specifying A4 and PLAIN PAPER as the paper size and the paper type respectively is transmitted to the printer 10 when the paper sizes concerning the paper tray, LC1, LC2, and LC3 (paper cassette #3) stored in the EEPROM 26 are B5, A4, B5, and B4 respectively and the paper types concerning the paper feeders stored in the EEPROM 26 are PLAIN PAPER and paper actually set in LC2 is A4-size paper.

In this case, the paper feeder satisfying the selection enable condition is only LC1 and therefore LC1 is determined the target paper feeder by performing the target paper feeder determination processing (step S105 in FIG. 6, FIG. 7), and printing is started. If LC1 becomes empty of paper, "NO PAPER LC1 A4" is displayed on the LCD 30 as step S111 is executed. State notification information containing information indicating occurrence of a paper error is transmitted to the target PC 100.

Since the target PC 100 executes the processing previously described with reference to FIG. 9, if LC1 becomes empty of paper (if the state notification information containing information indicating occurrence of a paper error is transmitted from the printer 10), an error occurrence notification window 70 is displayed on the display of the target PC 100.

That is, as the error occurrence notification window 70 is displayed on the display, the user is notified that a paper error has occurred. Then, usually the user presses the CONSUMABLE DETAIL button 71 on the error occurrence notification window 70.

When the user presses the CONSUMABLE DETAIL button 71, a printer detail window 60 and a paper setting dialog box 80 (FIG. 11) are displayed on the display of the target PC 100.

At this time, the displayed printer detail window 60 indicates the current state of each paper feeder (presence or absence of paper and current setup value of paper size/paper type). Thus, if the user already knows that paper set in LC2 is A4-size paper (for example, the user set the A4-size paper), the user can recognize that the paper size concerning LC2 is not correctly set. Thus, the user operates the paper setting dialog box 80, thereby changing the paper size concerning LC2 to A4.

Specifically, the user first displays PAPER CASSETTE 2 in the control 81 on the paper setting dialog box 80. Accordingly, "B5 182×257 mm" is displayed in the control 82 and thus the user operates the control 82, thereby displaying "A4 210×298 mm" in the control 82 and then presses the OK button 84.

When the user presses the OK button 84, a resetting command containing information indicting the state of the controls 81 to 83 on the paper setting dialog box 80 is transmitted from the target PC 100 to the printer 10. Upon reception of the resetting command, in the printer 10, new paper information based on the resetting command is rewritten into the EEPROM 26 at step S113 (FIG. 6), and then processing starting at step S103 is started. Therefore, in this case, the printer entering the print enable state is detected at step S105. Since the transition is made from the paper error state to the print enable state, state notification information is transmitted to the target PC 100 at step S108 and then processing starting at step S109 is performed (printing is continued)

Figure 12:
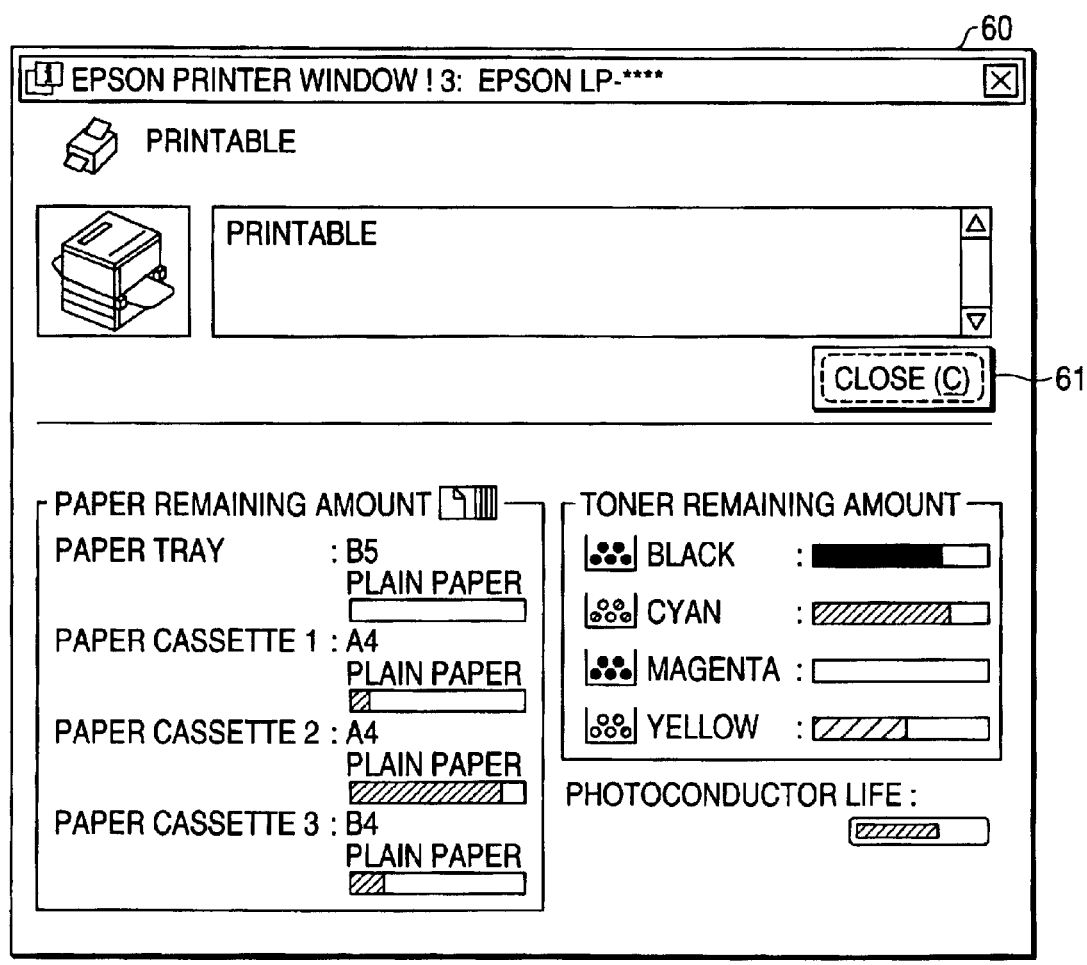
FIG. 12 is a schematic representation of a printer detail window displayed by the monitor program according to the embodiment of the invention after the paper size is again set.

In this case (when the user changes the paper information through the target PC 100), the target PC 100 receives the state notification information transmitted by the printer 10 with the printer detail window 60 only displayed. Thus, in the target PC 100, the contents of the printer detail window 60 are changed to those responsive to the received state notification information and consequently the printer detail window 60 on the display is changed to that shown in FIG. 12 (indicating that A4-size paper is stored in paper cassette #2).

If the user operates the control panel 12 of the printer in a manner as shown in FIGS. 8A to 8H for changing the paper information concerning LC2 to correct paper information, printing is also continued. If the user operates the control panel 12 for changing the paper information after displaying the printer detail window 60 and the paper setting dialog box 80 on the display, the state of the target PC 100 after completion of changing the paper information becomes a state in which the printer detail window 60 is displayed on the display shown in FIG. 12 (state in which step S303 is executed); if the user operates the control panel 12 for changing the paper information with the error occurrence notification window 70 displayed on the display, the state of the target PC 100 after completion of changing the paper information becomes a state in which the error occurrence notification window 70 is erased from the display (state in which step S301 is executed).

As described above in detail, if print data processing is interrupted because information set concerning paper (paper size, paper type) in the printer 10 contains information not representing the size, type of paper actually set in the paper feeder, the print system according to the embodiment can easily restart the interrupted processing and thus can provide an easier-to-print environment for the user. If the configuration of the print system is adopted, the printer having paper feeders provided with no original size detection mechanism can be used to construct a print system comparing favorably with a print system using a printer having paper feeders provided each with an original size detection mechanism. Therefore, if the configuration of the print system is adopted, an inexpensive print system can also be provided for the user.

<Modifications>

Various modifications of the print system according to the embodiment described above can be made. For example, the print system has the printer 10 and a plurality of PCs 100 connected by a LAN cable, but based on the art used in the print system, a print system having the printer 10 directly connected to the PC 100 may be implemented. The printer 10 contained in the print system has the paper feeders provided with no paper size detection mechanism, but the art may be applied to a printer 10 having some paper feeders each provided with a paper size detection mechanism.

Further, after processing for the print data specifying the paper feeder is started, when the specified paper feeder becoming empty of paper is detected, the printer 10 may be configured so that it waits for the user to again set the condition concerning the paper feeder (so that the user can specify any other paper feeder used for printing or specify automatic selection of paper feeder to continue printing).

In the print system according to the embodiment, the printer driver 40 and the monitor program 41 are installed in the PC 100, but the printer driver 40 may be prepared so as to also have the function of the monitor program 41. The window/dialog box displayed on the PC 100 may differ from that described above and the printer 10 may not be an electrophotographic printer, of course.

According to the invention, there can be provided a printer and a print system that can easily restart print data processing interrupted because the information concerning paper is not precisely set.

While the invention has been described in detail in the specific embodiment thereof, it will be obvious to those skilled in the art that various changes and modifications may be made without departing from the spirit and the scope of the invention.

What is claimed is:

1. A printer for receiving print data containing a specification value specifying specifications of paper to be used for printing and operating, said printer comprising:

paper storage means being capable of storing paper of various specifications;

print execution means for printing on paper stored in said paper storage means;

specification setup value storage means for storing a specification setup value;

specification setup value change means for storing a specification setup value specified by a user in said specification setup value storage means; and print control means for monitoring reception of print data, upon reception of print data, determining whether or not the specification value contained in the print data and the specification setup value stored in said specification setup value storage means match, if they match, starting print control processing of causing said print execution means to print in response to the print data, if they do not match, interrupting the print control processing, waiting for said specification setup value change means to change the specification setup value in said specification setup value storage means, and if the specification setup value in said specification setup value storage means is changed to the value matching the specification value contained in the print data, restarting the print control processing.

2. A printer according to claim 1 wherein said specification setup value change means has a function of storing the user-specified specification setup value contained in received information in said specification setup value storage means.

3. A printer according to claim 1 wherein said specification setup value change means has a function of keeping track of user-specified paper storage means and user-specified specification value from received information and changing the specification setup value in said specification setup value storage means concerning the user-specified paper storage means to the user-specified specification setup value.

4. A printer according to claim 1 wherein when said print control means interrupts the print control processing, said print control means waits for said specification setup value change means to change the specification setup value in said specification setup value storage means and also waits for a print cancel command to be given, and if the specification setup value in said specification setup value storage means is changed to the value matching the specification value contained in the print data, said print control means causes said print execution means to print in response to the print data and if a print cancel command is given, said print control means cancels processing for the print data and makes a transition to a state in which new print data can be received.

5. A printer according to claim 1 wherein the specification value and the specification setup value are paper size specification information.

6. A printer according to claim 1 wherein the specification value and the specification setup value are paper size and type specification information.

7. A printer for receiving print data containing a specification value specifying specifications of paper to be used for printing and operating, said printer comprising:

a plurality of paper storage means each being capable of storing paper of various specifications;

paper presence/absence detection means for detecting the presence or absence of paper in each of said plurality of paper storage means;

print execution means being capable of printing on paper stored in any of said plurality of paper storage means to print on paper;

specification setup value storage means for storing a specification setup value for each of said plurality of paper storage means;

specification setup value change means for changing the specification setup value in said specification setup value storage means concerning said paper storage means specified by a user to user-specified specification value; and print control means for waiting for print data to be received, upon reception of print data, repeating print control processing of finding said paper storage means satisfying a selection enable condition of a condition that the specification value contained in the print data and the specification setup value stored in said specification setup value storage means match and paper remains among said plurality of paper storage means using said paper presence/absence detection means and causing said print execution means to print the contents responsive to the received print data on paper stored in said found paper storage means until printing of all pages requested to be printed on the print data is complete or said printer is placed in a state in which said plurality of paper storage means do not contain any paper storage means satisfying the selection enable condition, if said printer is placed in the state in which said plurality of paper storage means do not contain any paper storage means satisfying the selection enable condition before printing of all pages requested to be printed on the print data is complete, interrupting the print control processing and waiting for said specification setup value change means to change the specification setup value in said specification setup value storage means, and if the specification setup value concerning one paper storage means in said specification setup value storage means is changed to the value matching the specification value contained in the print data, restarting the interrupted print control processing.

8. A printer according to claim 7 wherein said specification setup value change means has a function of keeping track of user-specified paper storage means and user-specified specification value from received information and changing the specification setup value in said specification setup value storage means concerning the user-specified paper storage means to the user-specified specification setup value.

9. A printer according to claim 7 wherein when said print control means interrupts the print control processing, said print control means waits for said specification setup value change means to change the specification setup value in said specification setup value storage means and also waits for a print cancel command to be given, and if the specification setup value in said specification setup value storage means is changed to the value matching the specification value contained in the print data, said print control means causes said print execution means to print in response to the print data and if a print cancel command is given, said print control means cancels processing for the print data and makes a transition to a state in which new print data can be received.

10. A printer according to claim 7 wherein the specification value and the specification setup value are paper size specification information.

11. A printer according to claim 7 wherein the specification value and the specification setup value are paper size and type specification information.

12. A printer comprising:

a plurality of paper storage means each being capable of storing paper of various specifications;

paper presence/absence detection means for detecting the presence or absence of paper in each of said plurality of paper storage means;

print execution means being capable of printing on paper stored in any of said plurality of paper storage means to print on paper;

specification setup value storage means for storing a specification setup value for each of said plurality of paper storage means;

specification setup value change means for changing the specification setup value in said specification setup value storage means concerning said paper storage means specified by a user to user-specified specification value; and print control means for receiving print data which always contains a specification value specifying specifications of paper to be used for printing and may or may not contain paper storage means specification information specifying any of said plurality of paper storage means and causing said print execution means to print, wherein upon reception of the print data not containing the paper storage means specification information, said print control means repeats print control processing of finding said paper storage means satisfying a selection enable condition of a condition that the specification value contained in the print data and the specification setup value stored in said specification setup value storage means match and paper remains among said plurality of paper storage means using said paper presence/absence detection means and causing said print execution means to print the contents responsive to the received print data on paper stored in said found paper storage means until printing of all pages requested to be printed on the print data is complete or said printer is placed in a state in which said plurality of paper storage means do not contain any paper storage means satisfying the selection enable condition, if said printer is placed in the state in which said plurality of paper storage means do not contain any paper storage means satisfying the selection enable condition before printing of all pages requested to be printed on the print data is complete, interrupts the print control processing and waits for said specification setup value change means to change the specification setup value in said specification setup value storage means, and if the specification setup value concerning one paper storage means in said specification setup value storage means is changed to the value matching the specification value contained in the print data, restarts the interrupted print control processing, and wherein upon reception of the print data containing the paper storage means specification information, said print control means determines whether or not the specification value contained in the print data and the specification setup value concerning said paper storage means specified by the paper storage means specification information contained in the print data in said specification setup value storage means match, if they match, causes said print execution means to print in response to the print data, if they do not match, waits for said specification setup value change means to change the specification setup value concerning said paper storage means specified by the paper storage means specification information in said specification setup value storage means, and if the specification setup value in said specification setup value storage means is changed to the value matching the specification value contained in the print data, causes said print execution means to print in response to the print data.

13. A printer according to claim 12 wherein said specification setup value change means has a function of keeping track of user-specified paper storage means and user-specified specification value from received information and changing the specification setup value in said specification setup value storage means concerning the user-specified paper storage means to the user-specified specification setup value.

14. A printer according to claim 12 wherein when said print control means interrupts the print control processing, said print control means waits for said specification setup value change means to change the specification setup value in said specification setup value storage means and also waits for a print cancel command to be given, and if the specification setup value in said specification setup value storage means is changed to the value matching the specification value contained in the print data, said print control means causes said print execution means to print in response to the print data and if a print cancel command is given, said print control means cancels processing for the print data and makes a transition to a state in which new print data can be received.

15. A printer according to claim 12 wherein the specification value and the specification setup value are paper size specification information.

16. A printer according to claim 12 wherein the specification value and the specification setup value are paper size and type specification information.

17. A printer comprising:

a plurality of paper storage means each being capable of storing paper of various specifications;

print execution means being capable of printing on paper stored in any of said plurality of paper storage means to print on paper; and print control means for waiting for reception of print data containing paper supply source specification information that can specify one or more paper storage means of said plurality of paper storage means, upon reception of print data, starting print control processing of causing said print execution means to print the contents responsive to the print data on paper stored in said paper storage means specified in the paper supply source specification information contained in the print data, when said paper storage means specified in the paper supply source specification information becomes empty of paper, interrupting the print control processing and waiting for new paper supply source specification information to be given, and if new paper supply source specification information is given, restarting the print control processing in a mode in which the printing is continued using paper stored in said paper storage means specified in the new paper supply source specification information.

18. A print system comprising:

a printer according to any one of claims 1 to 17; and a host for transmitting the print data to said printer.

19. A print system according to claim 18 wherein said host is an apparatus in which a program is installed for giving a computer a function of generating the print data for said printer and transmitting the print data to said printer.

* * * * *